Oct. 13, 1964   W. P. SCHMITTER   3,153,158
THRU-MOTOR DRIVE
Filed March 26, 1962   4 Sheets-Sheet 1

INVENTOR.
Walter P. Schmitter,
deceased,
BY A. LOUISE SCHMITTER
and ROBERT V. ABENDROTH,
CO-EXECUTORS,
BY Adrian L. Bateman, Jr. ATTORNEY Oct. 13, 1964  W. P. SCHMITTER  3,153,158
THRU-MOTOR DRIVE
Filed March 26, 1962  4 Sheets-Sheet 2
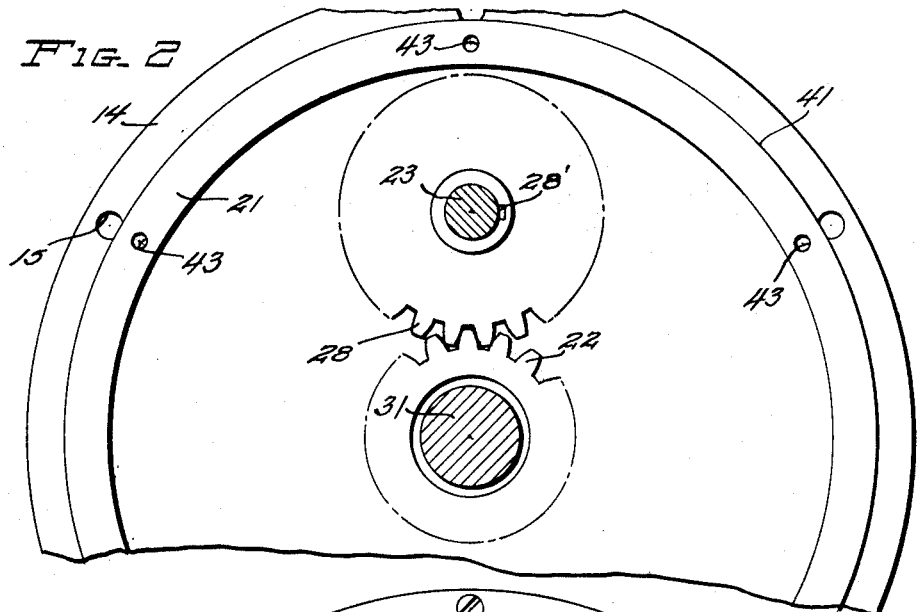
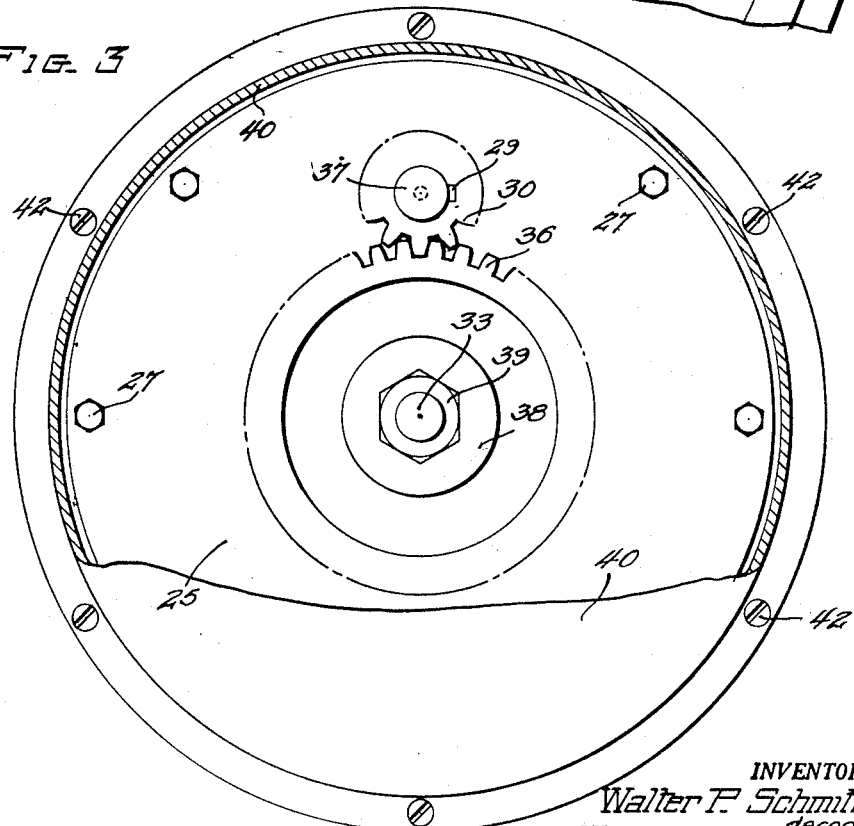
INVENTOR.
Walter P. Schmitter,
deceased.
BY A. LOUISE SCHMITTER
and ROBERT V. ABENDROTH,
CO-EXECUTORS.
BY Adrian L. Bateman, Jr. ATTORNEY

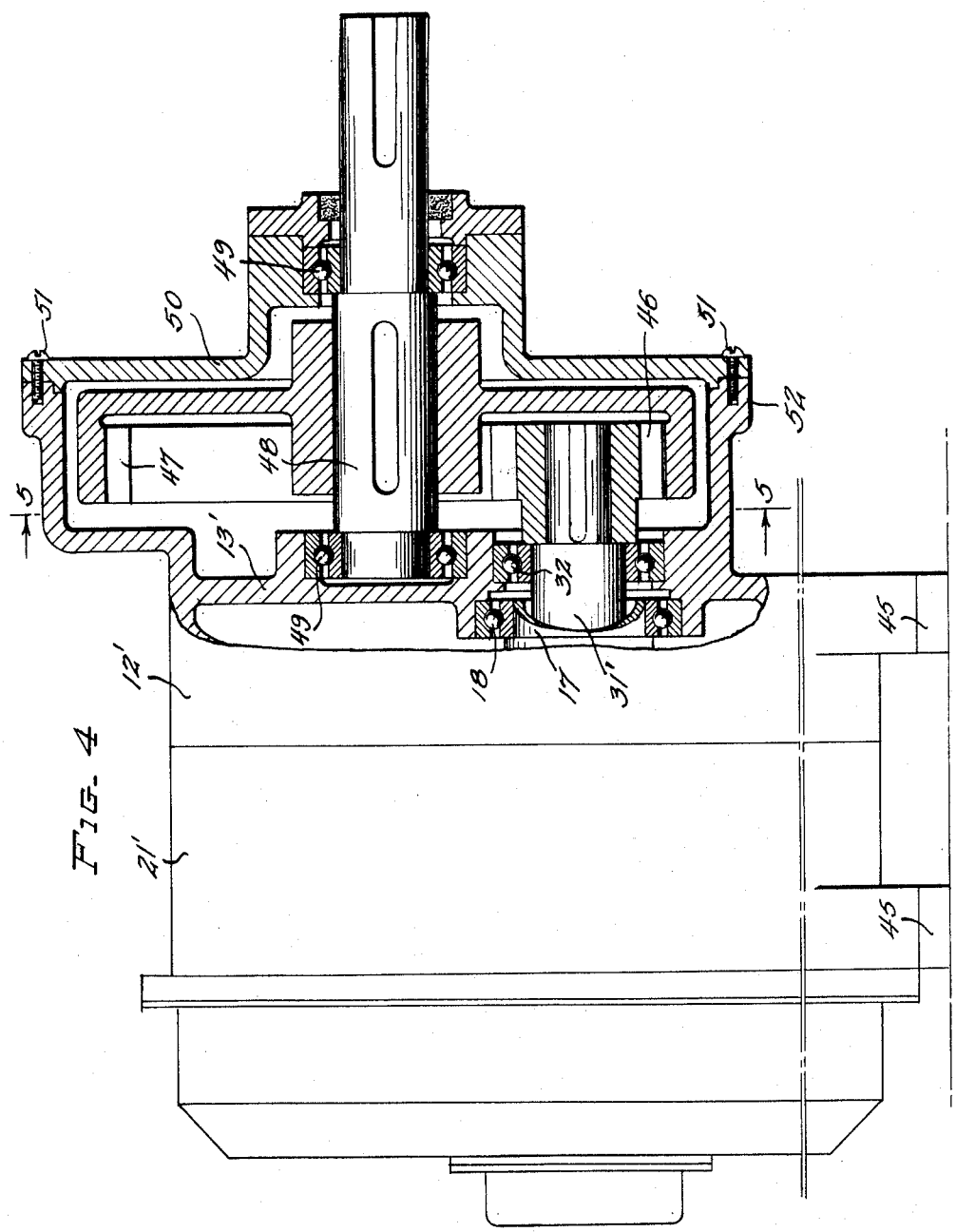

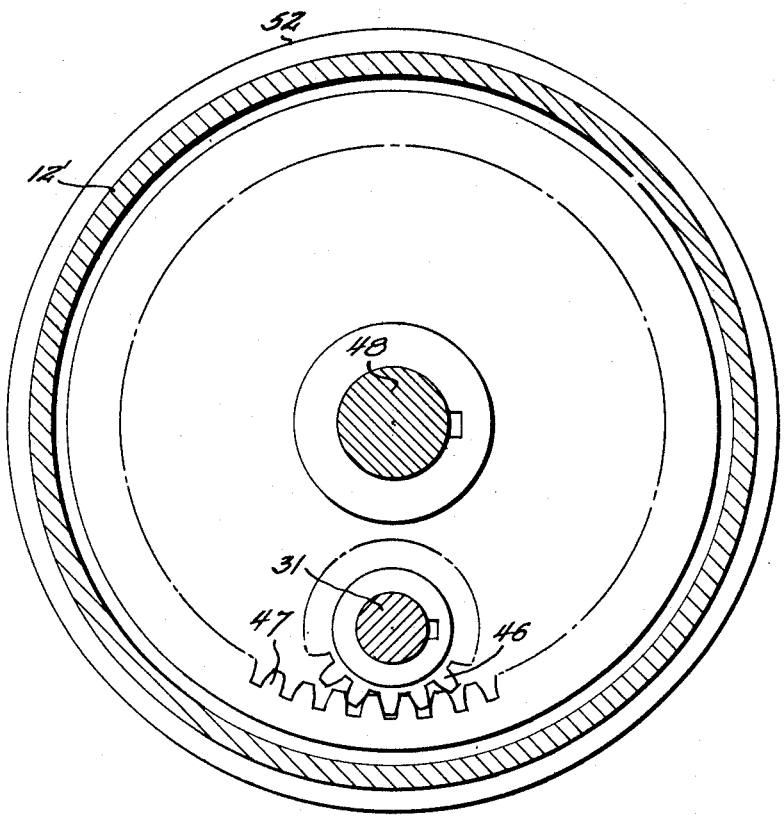

United States Patent Office 3,153,158
Patented Oct. 13, 1964

3,153,158
THRU-MOTOR DRIVE
Walter P. Schmitter, deceased, late of Wauwatosa, Wis., by A. Louise Schmitter, Wauwatosa, and Robert V. Abendroth, Whitefish Bay, Wis., co-executors, assignors to The Falk Corporation, Milwaukee, Wis., a corporation of Wisconsin
Filed Mar. 26, 1962, Ser. No. 183,693
4 Claims. (Cl. 310—83)

This invention relates to a compact combined motor and gear reduction unit adapted primarily for use as a power source for machine tools and other special machinery.

While numerous combined motor and gear reduction power transmissions are in common use, the majority, if not all, are relatively large in size and do not lend themselves to ready application to machine tools and other special machinery where space is at a premium. In most instances the combined motor and gear reduction transmissions now in common use are relatively large and do not afford facile means by which speed changes may be quickly and easily effected.

The primary object of the present invention resides in the provision of a new and improved compact combined motor and gear reduction unit of such design that it is adapted for ready application to machines where available mounting space is at a premium.

Another object resides in the utilization of a space saving compact thru-motor drive wherein a low speed driven shaft extends through a hollow shaft on which the relatively high speed motor is mounted.

Another object resides in the provision of readily accessible means for selectively applying one pair of a plurality of sets of change gears to an intermediate shaft and a driven shaft to obtain the desired speed for the power output shaft.

Another object resides in the provision in a compact motor and gear reduction unit of a fixed ratio initial gear reduction between the motor and an intermediate shaft and an adjustable gear reduction means comprising a plurality of pairs or sets of change gears adapted for selective mounting on the intermediate shaft and low speed power output shaft to establish the desired speed for the power output shaft.

Another object resides in the provision in a thru-motor drive of a two step gear reduction means disposed at one end of the motor and a third gear reduction means disposed at the opposite end of the motor.

Another object resides in the provision in a thru-motor drive of a two step speed reduction means disposed at one end of the motor in which one of the speed reductions is accomplished by the replaceable application of a selected pair of a plurality of sets of change speed gears having different ratios to the intermediate and drive shafts and wherein a third speed reduction means is disposed at the opposite end of the motor to thereby afford a simple compact and effective unit adapted for application as a power source to machines that afford limited mounting space for such units.

Other objects and advantages will become apparent from the following description of illustrative embodiments of the present invention.

In the drawings:

FIG. 2 is a fragmentary vertical sectional view, taken on the line 2—2 of FIG. 1, showing the initial fixed ratio gear reduction between the hollow drive shaft and an intermediate shaft;

FIG. 3 is a vertical sectional view, taken substantially on the line 3—3 of FIG. 1, showing one pair of a plurality of sets of mating gears adapted to be selectively applied to the intermediate and driven shafts of the unit to obtain the desired preselected speed for the driven power output shaft;

FIG. 4 is a view similar to that shown in FIG. 1, in which a second fixed gear reduction means is applied to the end of the driven shaft that is disposed opposite to the previously mentioned gear reduction means; and FIG. 5 is a vertical sectional view, taken on the line 5—5 of FIG. 4, showing a mating pinion and internal gear that forms a third speed reduction for the driven power output shaft.

Figure 1:
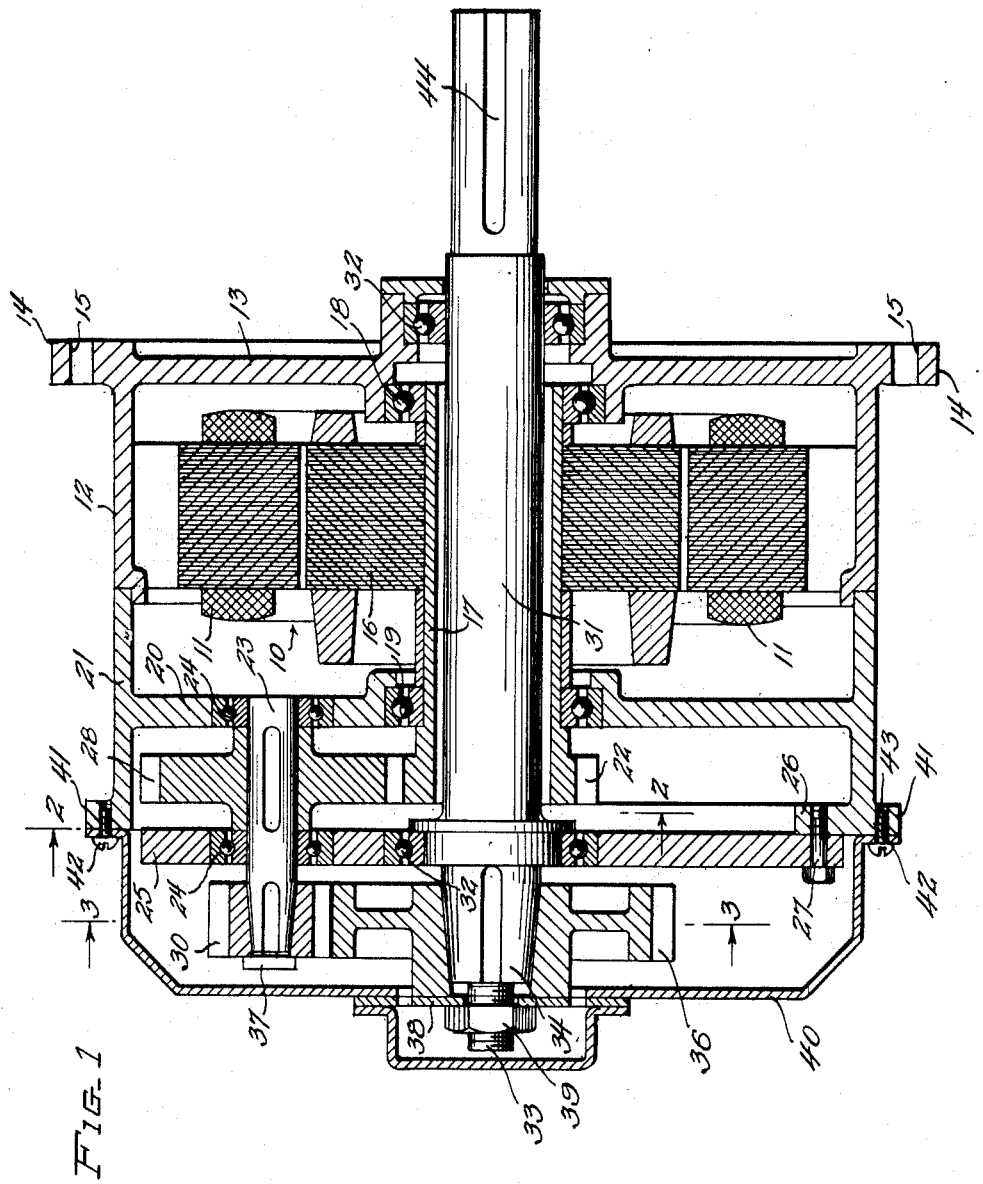
FIG. 1 is a vertical longitudinal sectional view through a compact combined motor and gear reduction unit constructed in accordance with the teachings of the present invention.

Referring more particularly to FIG. 1, it will be noted that a motor 10 comprises field coils 11 fixedly positioned in a casing 12 provided with end wall 13, a flange 14, having a plurality of circumferentially spaced holes 15 adapted to receive bolts for fixedly mounting the unit on a machine.

An armature 16 is mounted on a hollow drive shaft 17 that is journaled at one end in an anti-friction bearing 18 mounted in the end wall 13 of the casing 12. An anti-friction bearing 19, mounted in a partition 20 of a casing 21 that cooperates with the casing 12 to provide a housing for the motor 10 serves as the other journal for the drive shaft 17. A pinion 22 formed as an integral part of the outboard portion of the hollow drive shaft 17 is disposed within a cavity of the casing 21 that lies adjacent the partition 20 and remote from the motor 10.

An intermediate shaft 23 disposed in radial spaced relationship with the hollow drive shaft 17 is mounted in antifriction bearings 24 carried respectively by the partition 20 and a bearing plate 25 secured to a flange 26 formed on the casing 21 by means of screws 27. A gear 28 that is keyed to the intermediate shaft 23 is disposed in meshing engagement with the pinion 22.

The outboard portion of the intermediate shaft 23 is of tapered form provided with a key 29 adapted to releasably retain a gear 30 in fixed position on the shaft 23. The gear 30 forms one of a pair of a plurality of sets of gears adapted to be selectively applied to the intermediate shaft 23 and a driven shaft 31 that extends through the hollow shaft 17 and is mounted in anti-friction bearings 32 mounted respectively in the end wall 13 of the casing 12 and the bearing plate 25 fixedly attached to the casing 21. One outboard end of the driven shaft 31 is provided with a threaded portion 33 of reduced diameter that projects beyond a tapered portion 34 of the shaft that is provided with a key 35 on which a gear 36 that forms the companion gear for gear 30 may be replaceably applied. The gear 30 is releasably retained on the tapered end intermediate shaft 23 by the application of a screw 37. In like manner the gear 36 is releasably retained on the tapered end 34 of the shaft 31 by the application of a washer 38 and a nut 39 on the threaded portion 33 of the shaft 31.

A sheet metal cover 40 that is removably secured to a flange 41 formed on the casing 21 by the application of screws 42 to a circumferentially spaced series of threaded holes 43 forms a closure for the set of change speed gears 30 and 36.

The normal high speed rotation of the armature 16 of the motor 10 has its initial speed reduction accomplished by the mating pinion 22 and gear 28 that is keyed to the intermediate shaft 23. The second speed reduction between the motor 10 and the driven shaft 31 is accomplished by the application of a properly selected pair of mating gears, such as gears 30 and 36 that afford the desired ratio to drive the shaft 31 at the desired speed.

The outboard end of the driven shaft 31, that projects beyond the casing 12 at the end opposite the gears 36, is provided with a keyway 44 to provide a suitable means by which a power transmitting connection may be established between the combined motor and gear reduction unit and the machine to which the unit is applied.

Referring more particularly to FIG. 4 of the accompanying drawings, it will be noted that a slightly modified form of the invention is shown wherein cooperating casings 12' and 21' form the housing which contains all of the previously described mechanism. In the modified form of the invention the casings 12' and 21' are provided with feet 45 adapted to be secured to a suitable support for fixedly attaching the unit to the machine to be driven. In addition to the previously described mechanism, the embodiment of the invention shown in FIG. 4 includes additional speed reduction means applied to the outboard end of the driven shaft 31' that lies within the casing 12'.

A pinion 46 that is keyed to the shaft 31 is disposed in meshing engagement with an internal gear 47 that is keyed to a shaft 48 journaled in anti-friction bearings 49 housed respectively in a partition 13' of the casing 12' and a cover plate 50 suitably attached by means of cap screws 51 to a flange portion 52 that forms an integral part of the casing 12'. In the present instance, the shaft 48 forms the power output shaft of the transmission and it is provided with a keyway to which any suitable coupling means may be applied to transmit power from the unit to the machine to which the unit is attached.

From the foregoing description of the illustrative embodiments of the present invention, it will be noted that a simple and effective compact combined motor and gear reduction unit has been provided. In addition to the marked advantages obtained by the material reduction of its overall size by the incorporation of a thru-motor drive in the unit, it will be noted that there is no sacrifice in the power transmitting properties of the unit. A further advantage of the present unit lies in the fact that readily accessible means is provided by which the desired speed of the power output shaft may be preselected or changed at will be the removable application of a pair of mating gears, taken from a plurality of sets of gears, respectively applied to the intermediate and driven shafts of the unit.

While the invention has been described in considerable detail in the foregoing specification, it is to be understood that various changes may be made in its embodiment without departing from or sacrificing any of the advantages hereinafter claimed.

It is claimed:

1. In a combined motor and gear reduction drive unit including a housing, the combination of an electric motor within said housing, a hollow motor driven drive shaft journaled in said housing, an outboard gear mounted on said hollow drive shaft, an intermediate shaft journaled in said housing and disposed in parallel spaced relationship with said hollow drive shaft, an outboard portion on said intermediate shaft, a gear fixedly attached to said intermediate shaft and disposed in meshing engagement with said first named gear, said gears providing a first speed reduction for said motor, a driven shaft extending through said hollow shaft, said driven shaft being journaled in said housing independently of said drive shaft, said driven shaft having an outboard portion at one end disposed in parallel spaced relationship with the said outboard portion of said intermediate shaft and its other end projecting beyond the confines of said casing, a pair of mating gears removably mounted on said outboard portions of said intermediate and driven shafts whereby said pair of mating gears may be removed and replaced with others of a plurality of sets of change gears having different ratios, and a cover removably applied to said housing to form a closure for said last named pair of gears.

2. In a combined motor and gear reduction unit, the combination of a housing including a motor compartment and a cavity, an electric motor within said compartment, a hollow motor driven drive shaft journaled in said housing, said hollow drive shaft including an outboard portion disposed within said cavity and a gear fixedly mounted on said outboard portion of said hollow drive shaft, an intermediate shaft journaled in said housing in parallel spaced relationship with said outboard portion of said hollow drive shaft, said intermediate shaft having inboard and outboard portions, a gear fixedly attached to said inboard portion of said intermediate shaft, said last named gear being disposed in meshing engagement with said gear on said hollow drive shaft, a driven shaft journalled in said housing, said driven shaft extending through said hollow drive shaft and having inboard and outboard portions, a pair of mating gears removably mounted upon said outboard portion of said intermediate shaft and one outboard portion of said driven shaft, whereby said pair of mating gears may be replaced with others of a plurality of sets of change gears having different ratios, and a cover removably applied to said casing to form a closure for said last named pair of gears.

3. In a combined motor and gear reduction unit, the combination of a housing including a motor compartment and a cavity defined by an end wall and an intermediate partition, an electric motor within said compartment, a hollow motor driven drive shaft journaled in said end wall and partition, said hollow drive shaft including an outboard portion disposed within said cavity, a gear fixedly mounted on said outboard portion of said hollow drive shaft, a bearing support mounted on said casing in spaced relationship with said intermediate partition of said cavity, an intermediate shaft journaled in said bearing support and said partition of said cavity and disposed in parallel relationship with said outboard portion of said hollow drive shaft, said intermediate shaft having inboard and outboard portions, a gear fixedly attached to said inboard portion of said intermediate shaft, said last named gear being disposed in meshing engagement with said gear on said hollow drive shaft, a driven shaft journaled in said end wall and said bearing support, said driven shaft extending through said hollow drive shaft and having inboard and outboard portions, respective outboard portions of said driven shaft extending beyond said end wall and beyond said bearing support, a pair of mating gears removably mounted upon said outboard portion of said intermediate shaft and said outboard portion of said driven shaft which extends beyond said bearing support, whereby, said pair of mating gears may be removed and replaced with others of a plurality of sets of gears having different ratios, and a cover removably applied to said casing to form a closure for said last named pair of gears.

4. In a combined motor and gear reduction unit, the combination of a housing including a motor compartment and a pair of cavities disposed at the opposite ends thereof and defined by a pair of walls, an electric motor within said compartment, a hollow motor driven drive shaft journaled in said housing, said hollow drive shaft including an outboard portion disposed within one of said cavities, a gear fixedly mounted on said outboard portion of said hollow drive shaft, a bearing support mounted on said housing in spaced relationship with the outboard end of said hollow drive shaft, an intermediate shaft journaled in said bearing support and one wall of said motor compartment, said intermediate shaft having inboard and outboard portions, a gear fixedly attached to said inboard portion of said intermediate shaft, said last named gearing being disposed in meshing engagement with said gear on said hollow drive shaft, a driven shaft journaled in said housing, said driven shaft extending through said hollow drive shaft and having inboard and outboard portions, a pair of mating gears removably mounted upon said outboard portion of said intermediate shaft and one outboard portion of said driven shaft, whereby said pair of mating gears may be replaced with others of a plurality of sets of gears having different ratios, said other outboard end of said driven shaft being disposed in said cavity disposed at the other end of said motor, a cover plate for said last named cavity, a power output shaft journaled in said cover plate and the adjacent wall of said compartment offset from said driven shaft, mating internally and externally toothed gears fixedly mounted on said last named portion of said driven shaft and said power output shaft whereby a further speed reduction is imparted between said motor and power output shaft, and a cover for removable application to said casing to form a closure for said pair of mating gears applied to the outboard portions of said intermediate shaft and outboard portion of said driven shaft disposed at the end of said driven shaft that is remote from said power output shaft.

References Cited in the file of this patent

UNITED STATES PATENTS

| | | |
|---|---|---|
| 1,863,202 | Krohn | June 14, 1932 |
| 2,436,936 | Page | Mar. 2, 1948 |
| 2,444,886 | Vickers | July 6, 1948 |
| 2,487,328 | George et al. | Nov. 8, 1949 |